Aug. 19, 1969  C. R. TOMPSON  3,462,668

REVERSIBLE PM SYNCHRONOUS MOTOR WITH DIRECTION CONTROL SYSTEM

Filed March 11, 1968  2 Sheets-Sheet 1

INVENTOR.
Clement R. Tompson
BY
Agent

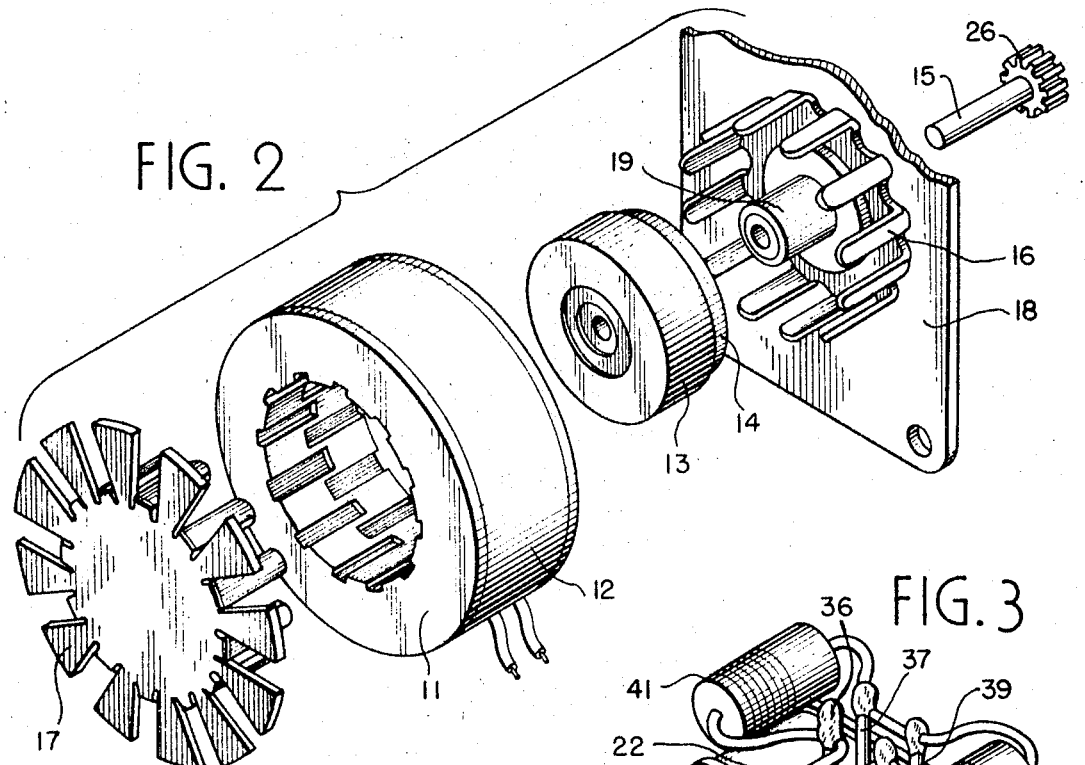
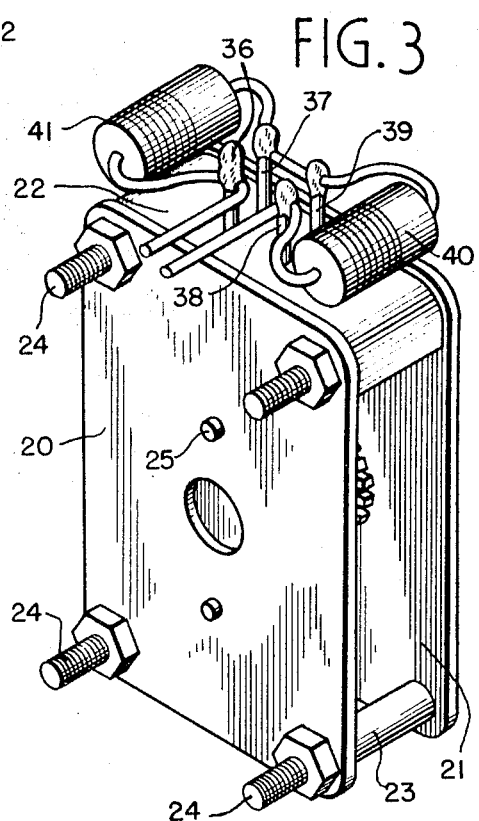
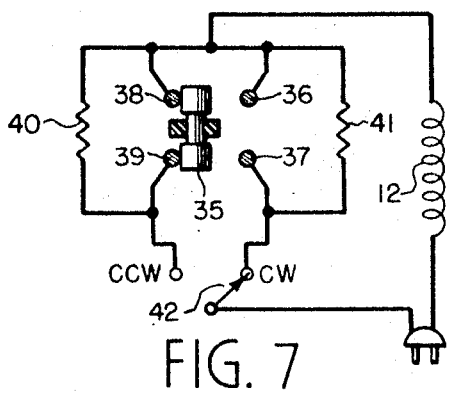
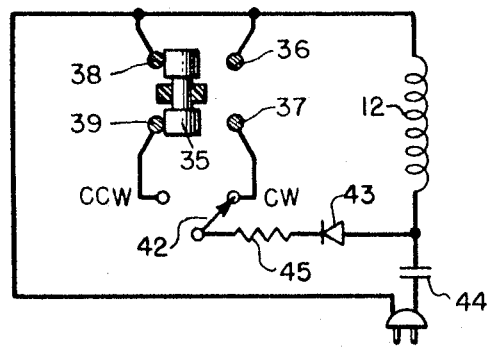

United States Patent Office
3,462,668
Patented Aug. 19, 1969

3,462,668
REVERSIBLE PM SYNCHRONOUS MOTOR WITH DIRECTION CONTROL SYSTEM
Clement R. Tompson, Melrose Park, Ill., assignor to Zenith Radio Corporation, Chicago, Ill., a corporation of Delaware
Filed Mar. 11, 1968, Ser. No. 711,935
Int. Cl. H02p 1/46
U.S. Cl. 318—174      9 Claims

ABSTRACT OF THE DISCLOSURE

An electrically reversible PM synchronous motor having conventional stator and rotor assemblies and utilizing a single field winding which provides normal excitation to the motor when connected to the AC line through a series dropping resistor. A pivot-arm type switch frictionally coupled to the rotor senses direction of rotation and shorts out the series resistor whenever the rotor attempts to turn in the wrong direction, thereby causing excessive excitation to be applied to the motor. This results in the rotor non-synchronously cogging until eventually it cogs a sufficient distance in the desired direction to open the switch, restoring normal excitation and allowing synchronous rotation in the desired direction. Thus, direction of rotation is controlled without the need for auxiliary or cross-field windings or special stator constructions, allowing the motor to be more economically manufactured.

SPECIFICATION

Background of the invention

The present invention relates to motors, and more particularly to an economical, reversible alternating current permanent-magnet synchronous motor.

While PM synchronous motors have seen wide use in applications requiring economical fractional-horsepower motors, the difficulty involved in adapting them to be reversible has somewhat limited their usefulness. Lacking auxiliary control means, it is well known that the direction of rotation of such a motor is unpredictable, depending on the chance circumstances of rotor position and phase of the applied alternating current. One method of insuring that the motor will rotate in one desired direction is to apply to its rotor an auxiliary magnetic field shifted in phase from the main stator field. This is often accomplished through the provision of a shaded pole, which in its simplest form comprises a shorted turn placed upon one of the stator poles to shift the phase of the field from that pole relative to the field from the remaining unshaded poles. Another method of controlling the direction of rotation is through the use of specially shaped pole pieces in conjunction with a mechanical brake assembly which brakes the motor shaft when it starts to rotate in the wrong direction.

The aforementioned methods of control, because they require mechanical modification of the motor stator structure to change direction, are suitable only where the direction of rotation is seldom or never changed, as in electric clocks or advertising displays. Where the direction of rotation is often changed it is usually desirable that control be accomplished electrically, and to this end an auxiliary or cross-field winding is commonly employed in addition to the main motor winding. The purpose of this winding is to provide for the rotor a second magnetic field shifted in phase from the main stator field, much as the shaded pole provided for the fixed direction motor. It follows that the excitation current for such a cross-field winding must be out-of-phase with that supplied to the main field winding, and to that end a capacitor or other phase-shifting device is usually included in series with the cross-field winding. It will be appreciated that such phase-shifting devices, together with the cross-field winding and extra stator structures, add substantially to the cost of reversible PM motors to the extent that they have been unduly cosly for many consumer products, such as television receiver remote control systems. Thus, until the present invention an unfulfilled demand has existed for a single-winding electrically reversible PM synchronous motor suitable for economical high-volume production.

Summary of the invention

Accordingly, it is a general object of the invention to provide a new and improved reversible alternating current motor.

It is a more specific object of the invention to provide a more economical reversible alternating current motor wherein the direction of rotation is electrically controlled.

It is a still more specific object of the invention to provide a reversible alternating current permanent magnet motor having only one excitation winding.

The invention is directed to a reversible alternating current motor comprising a stator assembly and a permanent-magnet rotor assembly. Means are provided for producing an alternating magnetic field between the stator and rotor assemblies, the field causing the rotor to synchronously rotate when the intensity of the field falls within a predetermined operating range, and to non-synchronously cog when the intensity of the field exceeds the predetermined range. Sensing means responsive to the direction of rotation of the rotor assembly are provided for generating a control effect when the rotor attempts to rotate in the wrong direction. Means are further provided for utilizing the control effect to increase the intensity of the magnetic field beyond the predetermined operating range thereby causing the rotor to non-synchronously cog until it rotates in the desired direction.

Brief description of the drawings

The foregoing and other objects of the invention which are believed to be novel are set forth with particularity in the appended claims. The organization and manner of operation of the invention, together with further objects and advantages thereof, may best be understood by reference to the following description taken in conjunction with the accompanying drawings, in the several figures of which like reference numerals identify like elements, and in which:

FIGURE 2 is an exploded view in perspective showing the constituent parts of the motor portion of the motor driven potentiometer assembly and illustrating the relative positions of the parts.

FIGURE 3 is a perspective view of the gear train portion of the motor driven potentiometer assembly.

FIGURE 6 is a schematic diagram of a preferred electrical circuit for the motor constructed in accordance with the invention.

FIGURE 7 is a schematic diagram of an alternate electrical circuit for a motor constructed in accordance with the invention.

Description of the preferred embodiment

Figure 1:
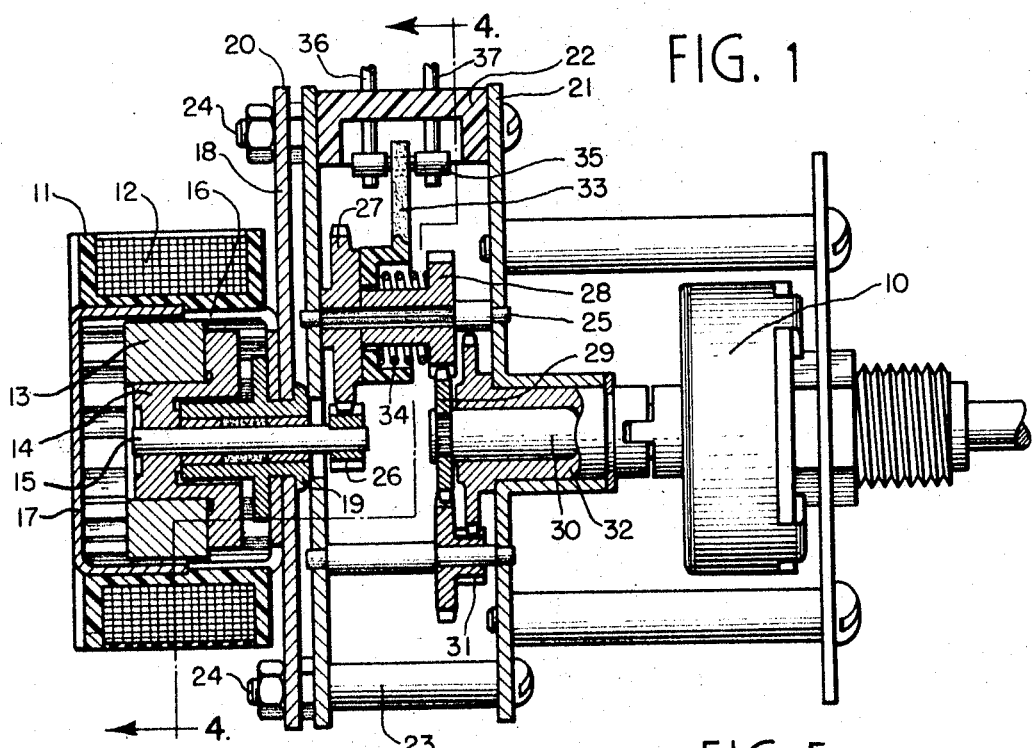
FIGURE 1 is a side view, partly in section, of a motor driven potentiometer assembly embodying a reversible PM synchronous motor constructed in accordance with the invention.

Referring to FIGURE 1, the reversible PM motor of the invention is shown in a motor driven potentiometer assembly, the shaft of a potentiometer 10 being rotatable to any desired position in response to an externally applied electrical control signal. It will be appreciated that such an assembly finds many applications in consumer electronic products, among which are the control of volume, hue and saturation in a remotely-controlled color television receiver.

Basically, the assembly of FIGURE 1 comprises a motor, a gear train and a potentiometer. The motor portion of the assembly may take on any one of a number of well known forms, and while the particulars of its construction are not of direct concern to the invention, a representative motor construction is shown in FIGURE 2. Referring to that figure, the stator comprises a bobbin-shaped coil form 11 on which a single field coil 12 is bobbin wound. The coil form has a central aperture of a diameter suitable for housing the motor rotor assembly, which comprises an annulus 13 of ferrite material supported by a non-ferrous cylindrical core 14. The whole rotor assembly is carried on a shaft 15 which serves to both support the assembly within the aperture of the stator coil form and to translate rotary motion to the gear train.

To route the magnetic field produced by coil 12 to the periphery of the rotor, the stator includes front and fear washer-like members, 16 and 17 respectively, each having a plurality of struck-out elongated pole pieces extending normally to their plane and disposed to index in slots molded into the periphery of the central aperture of coil form 11. The motor has a mounting plate 18 which, in addition to providing a convenient means of attaching the motor to the gear train assembly, cooperates with member 16 in directing the magnetic field to the rotor assembly. A sleeve bearing assembly 19 is staked to mounting plate 18 to support shaft 15 in coaxial alignment with the stator bobbin 11.

Referring now to FIGURE 1, when the elongated pole elements of members 16 and 17 are fitted into the slotted aperture of bobbin 11 a compact and economical stator structure is formed. The magnetic field produced by coil 12 appears in opposite sense across adjacent pole elements about the periphery of the bobbin aperture. There being twelve elongated pole pieces on each stator member, twelve pairs of opposite polarity magnetic poles are positioned symmetrically around the periphery of the rotor. The ferrite material of the rotor is permanently magnetized prior to assembly to form a like number of magnetic poles facing the pole pieces of the stator.

When an alternating current is applied to coil 12, an alternating flux field is set up in the stator and the pole pieces of members 16 and 17 alternately change magnetic sense. The interaction between these pole pieces and the salient fixed-sense poles of the rotor imparts a rotational moment to the rotor in a manner well known to the art. Providing this moment is within certain limits, sufficient to overcome the inertia of the rotor and its load but not sufficient to accelerate the rotor beyond its synchronous rotational speed, the continued influence of the ever-changing stator field accelerates the rotor to an equilibrium speed related to the frequency of alternating current applied to field winding 12. The actual equilibrium speed depends on the number of pole pieces as well as the applied line frequency, and in the case of the illustrated tweelve pole-pair 60 hertz motor, this is 300 r.p.m.

To reduce the motor shaft speed to a speed suitable for controlling the potentiometer, in this instance 6 r.p.m., a 50:1 gear train is included in the motor driven potentiometer assembly. Referring to FIGURE 3, the gear train comprises two flat frame members 20 and 21 spaced-apart by a block of nonconductive material 22 and a pair of spacer rods. The motor is mounted on the gear train by means of the four machine screws 24, which extend through holes on mounting plate 18.

Referring again to the cross-sectional view of FIGURE 1, the gear train contains a shaft 25 carried between its frame members and rotationally coupled to the motor shaft 15 by a pair of gears 26 and 27, mounted on shafts 15 and 25 respectively. Shaft 25 is rotationally coupled by gears 28 and 29 to a shaft 30, which extends through the body of potentiometer 10 to permit manual rotation of the gear train. Shaft 30 is in turn rotationally coupled to the wiper arm of potentiometer 10 by a speed-reducing idler gear 31, which has a larger diameter portion meshing with gear 29 and a smaller diameter portion meshing with a gear 32, which rotates the wiper arm of potentiometer 10. Thus, the setting of potentiometer 10 can be changed either by the motor via gears 26, 27, 28, 29, 31 and 32 at a 50:1 net speed reduction or by manual rotation of shaft 30, via gears 29, 31 and 32 at a 3:1 net speed reduction. The latter reduction results in a vernier control action and prevents the reverse-torque exerted by the permanent magnets of the rotor on the potentiometer from damaging the gear teeth during the manual operation of the potentiometer.

Figure 4:
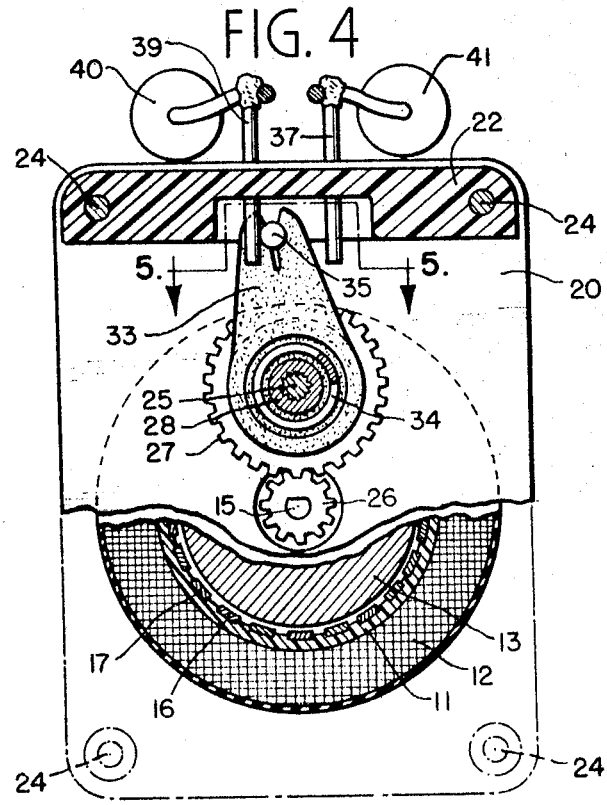
FIGURE 4 is a cross-sectional end view taken along lines 4—4 of FIGURE 1.
Figure 5:
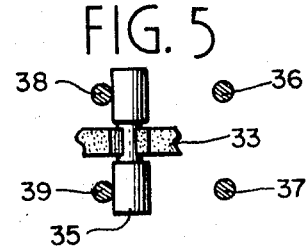
FIGURE 5 is a cross-sectional side view taken along lines 5—5 of FIGURE 4.

Included in the gear train and illustrated in FIGURES 1, 4 and 5 is an electric switch assembly responsive to the direction of rotation of motor shaft 15. The switch comprises a pivot arm 33 of non-conductive material such as linen bakelite frictionally coupled to gear 27, which it will be recalled is rotationally coupled to motor shaft 15 by gear 26. A coil spring 34 forces arm 33 against one face of gear 27 to achieve the desired amount of rotational friction coupling. A metallic contact member 35 is carried on the free end of the pivot arm and is disposed to make contact with a pair of electrical contacts 36, 37 at one extreme of its travel with a second pair of contacts 38, 39 at the other extreme. By virtue of the rotational coupling between arm 33 and gear 27, when shaft 15 rotates in the clockwise direction, gear 27 rotates in the counterclockwise direction and contacts 38, 39 are shorted by contact member 35. Conversely, upon rotation of the motor shaft in the counterclockwise direction, gear 27 rotates clockwise and contact members 36, 37 are shorted. Member 35 is preferably not rigidly affixed to arm 33 so that a floating contact arrangement is realized wherein alignment of the contact pairs is not critical. As will be seen shortly, this switch assembly allows the direction of rotation of the motor to be controlled without the use of cross-field or auxiliary windings.

During operation of the motor an alternating current is applied to the motor field winding. Assuming the rotor to be initially at rest, the alternating magnetic field resulting in the stator from this current causes the permanently magnetized rotor to oscillate in one direction or the other, depending on the relative magnetic sense of the pole pieces and the salient rotor magnets at any particular instant. When the extent of this oscillation is such that the rotor magnets move between adjacent stator pole pieces at the same rate as the pole pieces change magnetic sense, the rotor experiences a continuous rotational moment and thereafter continues rotation at a speed synchronously related to the frequency of alternation of the stator field. For the 12 pole-pair 60-hertz motor of the illustrated embodiment, the instantaneous amplitude and velocity of the oscillation must exceed 15° and 300 r.p.m. respectively, for the motor to operate.

If the magnetic field applied to the rotor is too small, the synchronous speed will not be reached and the rotor will merely oscillate about one fixed position. On the other hand, if the applied field is too large the oscillation will instantaneously build up to an amplitude and speed in excess of that required to achieve synchronous rotation. Then, instead of advancing to the next pole piece at the same rate as that pole piece changes magnetic sense, the rotor will overshoot that and possibly other pole pieces and come to rest at some arbitrary position, from which it will again be caused to jump poles in the same or reverse direction should the excessive excitation persist. This action may be referred to as bi-directional "non-synchronous cogging," inasmuch as the rotor bi-directional "cogs" to various discrete angular positions under the influence of the excessive magnetic field. The rotor cannot continuously rotate during periods of over-excitation because it is out of sync with the rate of change of the magnetic sense of the stator pole pieces.

The magnetic field intensity necessary to initiate and maintain rotation is not critical, because the rotor can angularly lag or lead the applied field to compensate for excesses or deficiencies of excitation. However, a maximum value or threshold does exist above which the rotor can no longer compensate by angular displacement. Similarly, a threshold value of minimum magnetic field intensity exists below which rotor inertia and loading cannot be overcome to achieve the instantaneous angular velocity required at starting. Thus, a range of magnetic field intensities exists for which the motor will operate and intensities outside of this range will not allow the motor to function. As will be seen, this fact is used to advantage by the invention to obtain a reversible PM synchronous motor without cross-field or auxiliary windings.

It will be recalled that the direction of rotation of a PM synchronous motor is ambiguous, there being theoretically a 50 percent chance of rotation in one desired direction each time the motor is started. In accordance with the invention, a PM synchronous motor is made to rotate in one desired direction by providing means for over-volting or increasing its field excitation above a maximum threshold level when it begins to rotate in the undesired direction. This may be done for one or both half-cycles of the applied alternating current. Sensing means, in this case in the form of a pivot-type switch assembly frictionally-coupled to the motor shaft, sense rotation in the wrong direction and over-volt the motor by shorting out a dropping resistor series-connected with the motor field. While thus over-volted, the rotor non-synchronously cogs between poles in both directions until eventually it cogs a sufficient distance in the desired direction to remove the short from the series resistor, restoring normal excitation and allowing synchronous rotation in the desired direction. The amount of time involved in this starting operation is actually quite small, and barely noticeable to someone observing the motor operation.

Various circuit arrangements are possible for over-volting the motor field winding when the motor attempts to rotate in the wrong direction. The simplest and most economical method is shown in FIGURE 6. A pair of resistors 40, 41 are shunt-connected across respective contact pairs of the switch assembly and one terminal from each of the contact pairs is connected to one terminal of motor field winding 12. A single-pole double-throw direction control switch 42 is provided for connecting one side of the AC line to the remaining terminal of a selected one of the contact pairs and the other side of the AC line is connected to the remaining terminal of winding 12. Depending on the position of the switch 42 AC current is applied to the field winding through either contact pairs 38, 39 or 36, 37. The particular contact pair selected depends on the desired direction of rotation of the motor, for clockwise rotation pairs 36, 37 being utilized and for counterclockwise rotation pairs 38, 39 being utilized.

Field winding 12 is so designed that it will supply a magnetic field to the rotor at an intensity within the permissive operating range only when one of the fixed resistors is series-connected between it and the AC line, and will be over-volted and provide excessive excitation whenever the series resistor is shorted out. In the illustrated embodiment, field coil 12 is wound on a bobbin form 11 approximately ⅞ inch in diameter with 3000 turns of No. 40 wire and requires a series resistor of 1800 ohms for normal operation from a 120 volt AC line. Assuming that AC current is being applied to winding 12 through contact pair 36, 37, resistor 41 will be shorted out by contact 35 whenever the motor attempts to turn in the counterclockwise direction. This of course overvolts the motor, and the rotor is forced to non-synchronously cog between poles until it accomplishes a clockwise rotation sufficient to move contact 35 away from pair 36, 37. Conversely, during counterclockwise direction resistor 40 is in series with winding 12 during counterclockwise rotation and is shorted by contact member 35 during attempted rotation in the clockwise direction.

Other circuit arrangements are possible for accomplishing over-volting. For instance, in FIGURE 7 a diode and capacitor are employed to establish a DC current through winding 12 when the motor attempts to rotate in the wrong direction. This is equivalent to over-volting winding 12 on alternate half cycles of the appled alternating current and provides smoother starting action than the circuit of FIGURE 6 because the rotor is subjected to magnetic acceleration forces only on alternate and identical half-cycles during over-volting periods. Direction control switch 42 in this case is connected so that a diode 43 will be shunt-connected across field winding 12 when the motor attempts to rotate in the wrong direction. This establishes in conjunction with a capacitor 44 a half-wave rectifier circuit which develops a DC current in winding 12. A current-limiting resistor 45 is connected in series with diode 12 for protection of that device. Typically, capacitor 44 may have a value of 1 microfarad (bi-polar), resistor 45 may be 820 ohms and diode 43 may be a type 1N443 silicon rectifier.

Figure 8:
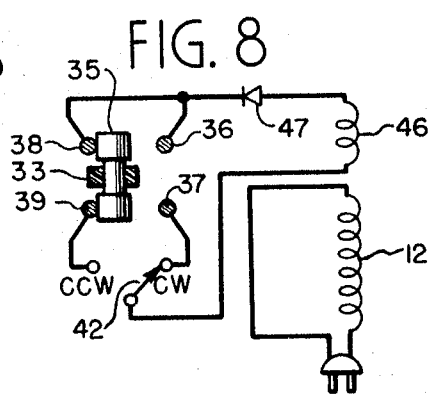
FIGURE 8 is a schematic diagram of still another alternate electrical circuit for a motor constructed in accordance with the invention.

Another possible circuit arrangement for over-volting the motor is shown in FIGURE 8. In this instance an auxiliary winding 46, bifiliar wound with the main field winding 12, is employed in conjunction with a diode 47 and direction selector switch 42 to provide over-volting action. When the motor attempts to turn in the wrong direction, diode 47 is shunt-connected across auxiliary winding 46 and, because of transformer action with main field winding 12, causes an over-volting condition in the stator field on alternate half cycles of the applied alternating current. This provides the same advantage as the circuit of FIGURE 7, namely, smoother motor starting action during over-volting periods. Winding 12 and 46 may typically be 3000 turns of number 42 wire each, bifiliar wound about a ⅞ inch bobbin case. Diode 47 may be a type 1N443. It would of course also be possible to apply an external source of direct current to winding 46 and thereby obviate the need for diode 47.

It will be appreciated that numerous other circuits are possible for over-volting the motor when it attempts to rotate in the wrong direction. No attempt has been made here to cover all such possibilities, but the circuits known and believed to be more desirable have been presented. Although direction sensing means is shown in the form of a frictionally-coupled pivot-arm switch, it will be appreciated that other methods could be utilized, including photocells, electrical transducers and micro-switches. The only requirement is that the switch be suitably sensitive and not be so far removed from the motor as to introduce excessive delay due to backlash in the gear train. The exact manner in which the field is over-volted or the direction of rotation sensed is not paramount to the invention. In fact, the invention can be practiced using almost any kind of PM synchronous motor, remembering that the greater the number of poles, the better the pole-jumping action during periods of over-volting.

A reversible PM synchronous motor has been shown which is economical and relatively simple to construct. Because of its few moving parts, it is inherently reliable and has no electrical contacts capable of providing interference to electrical appliances. Because of its simplicity and economy of manufacture, it is ideally suited for use in motor driven controls in television receivers and other consumer products where economy of manufacture is necessarily of prime importance.

While particular embodiments of the present invention have been shown and described, it will be obvious to those skilled in the art that changes and modifications may be made without departing from the invention in its broader aspects. Accordingly, the aim in the appended claims is to cover all such changes and modifications as may fall within the true spirit and scope of the invention.

I claim:

1. A reversiblue synchronous motor operable from a source of alternating current, comprising:
   a stator assembly;
   a permanent-magnet rotor assembly;
   means for establishing an alternating magnetic field between said stator and rotor assemblies, said field causing said rotor to synchronously rotate when the intensity of said field falls within a predetermined operating range, and to non-synchronously cog when the intensity of said field exceeds said predetermined range;
   sensing means responsive to the direction of rotation of said rotor assembly for generating a control effect when said rotor attempts to rotate in the wrong direction; and
   means for utilizing said control effect to increase the intensity of said magnetic field beyond said predetermined operating range, thereby causing said rotor to non-synchronously cog until it rotates in the desired direction.

2. A reversible alternating current motor as described in claim 1 wherein said magnetic field establishing means comprise a field winding on said stator assembly electrically connected to said source of alternating current.

3. A reversible alternating current motor as described in claim 2 wherein said sensing means comprise an electric switch and said control effect comprises the closing of contacts on said electric switch.

4. A reversible alternating current motor as described in claim 3 wherein said control effect utilizing means comprise an impedance series-connected between said field winding and said source of alternating current, and said switch contacts are connected to short-circuit said impedance when said rotor rotates in the wrong direction.

5. A reversible alternating current motor as described in claim 2 wherein said control effect utilizing means establish a direct current through said winding only during rotation of said rotor in the wrong direction to increase the intensity of said magnetic field beyond said predetermined operating range only on alternate half-cycles of said applied alternating current.

6. A reversible alternating current motor as described in claim 5 wherein said control effect utilizing means further comprise a diode shunt-connected across said stator field winding and a capacitor series connected between said winding and said alternating current source.

7. A reversible alternating current motor as described in claim 2 wherein said magnetic field establishing means further comprise an auxiliary winding and said control effect utilizing means comprise means for energizing said auxiliary winding when said rotor rotates in the wrong direction.

8. A reversible alternating current motor as described in claim 7 wherein said sensing means comprise an electric switch, said control effect comprises the closing of contacts on said switch, and said control effect utilizing means further comprise a diode connected across said auxiliary winding by said contact closure.

9. Reversible electrodynamic apparatus comprising:
   a PM synchronous motor having an output shaft and a field excitation winding, said motor having an unpredictable direction of rotation and responding to excitation in excess of a predetermined level by non-synchronously bi-directionally cogging:
   sensing means comprising an electric switch frictionally coupled to said output shaft, said switch assuming one position during clockwise rotation of said shaft and another position during counterclockwise rotation of said shaft;
   a direction control switch having a clockwise position and a counterclockwise position for prescribing the desired direction of rotation of said motor; and
   circuit means connected between said direction sensing and control switches and said field excitation winding for applying excessive excitation to said motor when the position of said sensing switch does not correspond to the position of said control switch as a result of said motor attempting to rotate in the wrong direction, said excessive excitation being removed to allow normal synchronous rotation when said non-cynchronous cogging causes said motor to rotate in the desired direction.

References Cited

UNITED STATES PATENTS

| | | | |
|---|---|---|---|
| 2,264,068 | 11/1941 | Chambers | 318—178 |
| 2,769,947 | 11/1956 | Elliott | 318—267 |
| 3,239,741 | 3/1966 | Rank | 318—313 |
| 3,416,017 | 12/1968 | Krug | 310—164 |

WARREN E. RAY, Primary Examiner

U.S. Cl. X.R.

310—41, 69, 72, 164; 318—515